United States Patent [19]

Van Geel et al.

[11] Patent Number: 5,068,512

[45] Date of Patent: Nov. 26, 1991

[54] DEVICE FOR PRODUCING AMORPHOUS CERAMIC PRODUCTS OR METAL ALLOYS

[75] Inventors: Jacobus Van Geel; Joseph Magill, both of Karlsruhe; Paul Werner, Dettenheim; Jean-Pol Hiernaut, Linkenheim, all of Fed. Rep. of Germany

[73] Assignee: European Atomic Energy Community, Luxembourg

[21] Appl. No.: 573,229

[22] PCT Filed: Apr. 3, 1989

[86] PCT No.: PCT/EP89/00360

§ 371 Date: Sep. 26, 1990

§ 102(e) Date: Sep. 26, 1990

[87] PCT Pub. No.: WO89/09674

PCT Pub. Date: Oct. 19, 1989

[30] Foreign Application Priority Data

Apr. 7, 1988 [LU] Luxembourg .................. 87192

[51] Int. Cl.⁵ .................................. B23K 26/00
[52] U.S. Cl. .................. 219/121.6; 219/121.65; 219/121.76
[58] Field of Search ............ 219/121.6, 121.65, 121.66, 219/121.76, 121.77

[56] References Cited

U.S. PATENT DOCUMENTS 4,606,883 8/1986 Wizemann et al. .................. 419/8
4,966,737 10/1990 Werner et al. ..................... 264/14

Primary Examiner—C. L. Albritton
Attorney, Agent, or Firm—Sughrue, Mion, Zinn, Macpeak & Seas

[57] ABSTRACT

The device disclosed comprises a high-pressure autoclave in which a moulded blank of the sample is heated by means of laser beams to the melting point and then rapidly cooled. The sample is maintained in a processing position (2) in an autoclave (1) without contact by means of an acoustic levitation device (12). Laser beams are directed through windows (19) in the autoclave onto the processing position and heat the sample. The molten sample then passes between two mutually impacting dies (20,21) by which it is crushed and thus rapidly cooled.

6 Claims, 1 Drawing Sheet

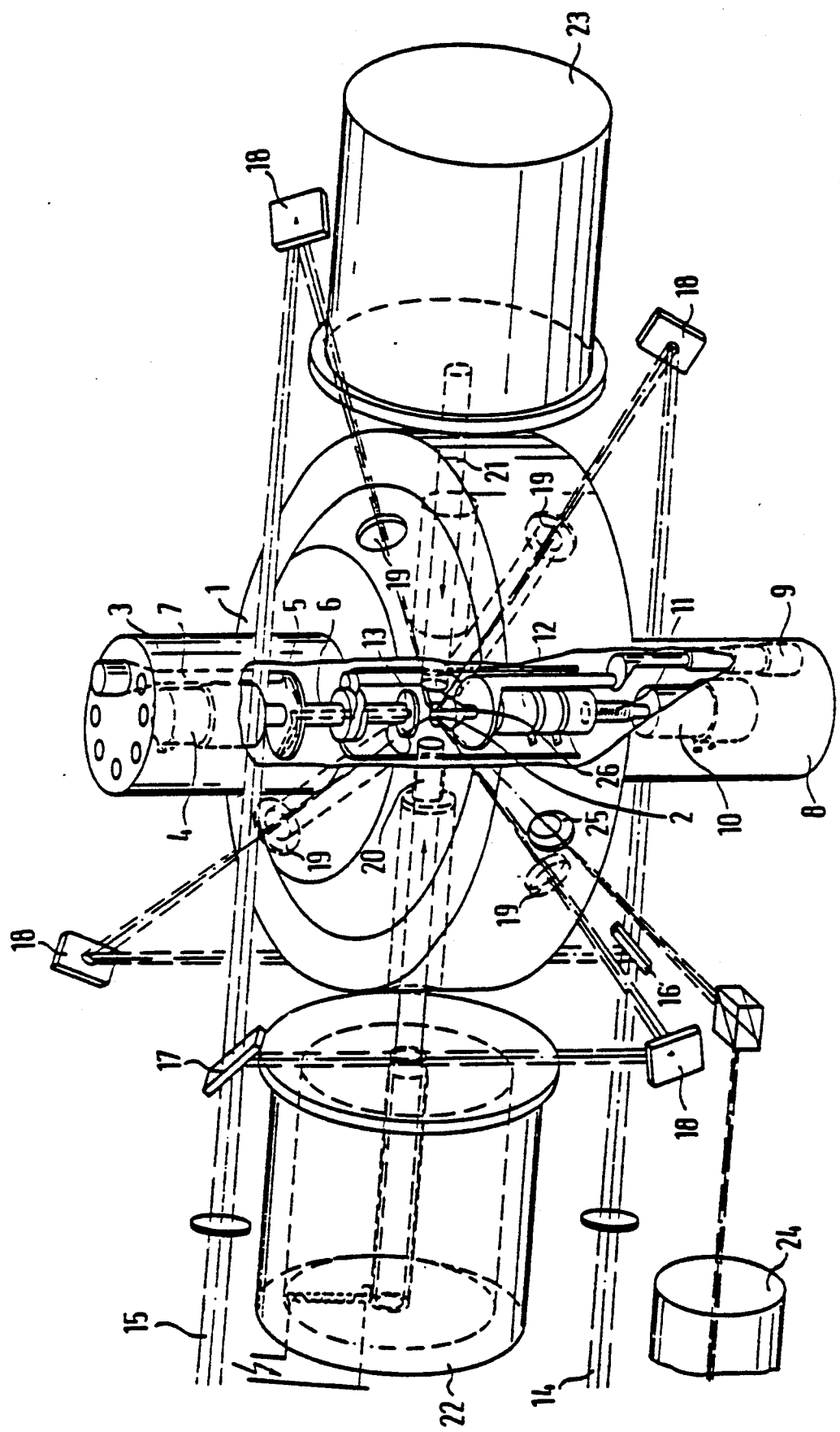

DEVICE FOR PRODUCING AMORPHOUS CERAMIC PRODUCTS OR METAL ALLOYS

The invention relates to a device for producing amorphous ceramic products or metal alloys by means of a high pressure autoclave in which firstly a preform of the sample is heated by means of laser beams up to melting temperature and is then rapidly cooled down.

Amorphous metal alloys, also called metal glasses, have been known for twenty years. They are constituted by a noncristalline body having an unsystematic structure which is obtained by cooling down a molten charge. The cooling is carried out at high speed (at about $10^6 Ks^{-1}$) down to a temperature at which crystallization is no more possible.

Such amorphous substances show new mechanical, electrical and chemical characteristics which are not achieved by the corresponding crystallized variations.

The high cooling speed of the molten material is decisive for the production of such amorphous substances. Thus, a method is known in which the molten material flows from an inductively heated melting pot onto the periphery of a copper disk having a band scraper and rotating about a horizontal axis. It is also possible to introduce the molten material between two narrow copper disks rotating about horizontal axes or to bring it onto the disk surface of a copper disk rotating about its vertical axis.

It has also previously been proposed to maintain an electrically conductive molten material without container magnetically in suspension and to heat it up inductively in such a way that impurities from the melting pot cannot impair the alloy. In space tests, droplets of a non-conductive material without melting pot have also been heated up by means of laser beams. The droplets are held in space in a defined position by means of air nozzles.

From DE-A 20 32 577 a method is known per se for melting fireproof materials by means of at least two laser beams directed through windows in a process autoclave onto a preform, a method which is preferably carried out under gravity free space condtions.

Apart from the cost which is involved in the transfer of production of such alloys-into space, the problems of sample positioning and sample stability are not yet solved in a satisfactory manner. It is the aim of the invention to provide a device for producing amorphous substances which makes it possible to produce such amorphous substances, and even electrically non-conducting substances, at high purity within the gravity field of the earth. This aim is reached by the device as characterized in claim 1. As to preferred embodiments of the invention, reference ist made to the subclaims.

The invention will now be described by means of a preferred embodiment and the unique drawing which shows schematically and in perspective a device according to the invention.

The device contains as essential element an autoclave 1 of essentially cylindrical shape, in the central point of which is located the process position 2, i.e. the place where a spherical sample is to be heated and cooled. The sample originates from a sphere-feed device 3, which is axially mounted on the autoclave 1 and which holds at disposal a series of spheres or preforms with the composition of the desired alloy one after the other in view of the transfer to the process position 2. To this end, this device contains a step-by-step motor 4 and an individualization disk 5 driven by it, as well as a hollow shaft 6, through which a sphere released by a magazine 7 can drop into the process position 2. Opposite to the process position of the sphere feed device 2 a housing 8 is mounted on the autoclave 1, which housing contains a recipient 9 for collecting the finished samples as well as a lift motor 10 which carries via a spindle 11 an acoustic resonance-levitation installation 12. The latter is situated below the process position 2 and contains several electrically excitable piezoceramic disks.

Between the process position 2 and the levitation installation 12 there is further inserted an acoustically permeable catch basket 26, and above the process position there is provided a reflector disk 13, through the central hole of which the sphere is fed from the magazine 7. The acoustic waves generated by the levitation installation are reflected by the reflector disk 13 at a distance capable of resonance, so that a precise, driftless, stable, repeatable positioning without oscillation of the sphere is achieved, without polluting the sphere by contact with a wall. This method works at autoclave pressures from 10 Bar to 1000 Bar and at temperatures from 1000 K to 4000 K and more as well as with any inert gases, and enables the contactless support of metallic as well as electrically non-conducting materials. The sphere diameters can lie between 0.2 and 2 mm and the levitation time can be extended at wish and only requires a small amount of power, compared for example with electromagnetic induction levitation techniques. By adjusting the lift motor 10, the sphere can be exactly levitated into the process position.

The heating up of a sphere in the process position 2 is carried out by two laser beams 14 and 15, which can be derived from a common Nd-YAG generator. By a beam divider mirror 16 and 17, the two laser beams are respectively divided into two respective beams, which are directed via derivation mirrors 18 and through windows 19 in the wall of the autoclave 1 onto the process position 2, and this in such a way that facing beams do not dazzle each other and thus the generators cannot be destroyed by dazzling light. Preferably, two laser beams respectively run along the edges of two imaginary four-sided pyramids facing each other, the tops of which are constituted by the process position and the edges of which are mutually aligned. Two laser beams respectively attributed to a pyramid lie in one plane, Which is orthogonal to the corresponding plane of the other laser beams.

Also directed onto the process position, but perpendicular to the axis of the autoclave, two stamps 20 and 21 are movably disposed in alignment, the front faces of which act as cooling heads and lie at either side of the process position thereby facing each other diametrically. The guiding channel for the stamp 20 or 21 respectively is tightly mounted in the wall of the autoclave 1 and under the hydrostatical gas pressure of the latter. By simultaneously applying an electrical pulse on dive coils 22 and 23 acting on the stamps, the two stamps are accelerated in opposite directions and crash with a crash speed of for example 12.0 msec$^{-1}$. By this crash, a molten sphere which is situated in the process position, is crushed between the front faces of the stamps and cooled down with high speed (higher than $10^6$ Ksec$^{-1}$) and compressed to become a flat cylinder of 10 to 50 μm thickness. The cooling speed is variable via the acceleration stroke.

In order to be able to precisely follow and possibly influence the process, a six-wavelength-pyrometer 24 is provided, which is directed onto the process position through a further window 25 in the autoclave wall and which permits the continuous measurement of temperatures between 1200 and 5000 K. For example, optical wavelengths 500 nm, 600 nm, 680 nm, 800 nm, 960 nm and 1040 nm are processed. The apparatus can carry out a measurement in microseconds and spatially resolve 50 μm concerning the minimum measure spot size. Such a pyrometer is described in the journal Temperature, 1982, vol. 5, pages 439 to 446.

An electronic development control (not shown) coordinates the function of the laser generators, the levitation installation and the cooling stamps as follows:

Firstly, the sphere magazine 7 of the feed device 3 is filled with about 50 preforms of the sample and then closed in a gastight manner. Then the autoclave is filled with the gas suited for the process and brought to the desired pressure. The following step is to bring a preform sphere into the feed channel 6 by operation of the motor 4, from where it drops into the catch basket 26 just below the process position 2. When now the piezoceramic levitation installation 12 is switched on, the preform in the process position comes into a suspension state which can possibly be adjusted by means of the lift motor 10. Now, the two lasers 14 and 15 are activated for a short time and simultaneously, the pulse duration and the pulse energy depending on the desired temperature. The preform then melts in a reproducible short time, so that now the dive coils 22 and 23 can be activated and the stamps 20 ands 21 can crush the molten sample between them. After the rebounding of the stamps and the switching off of the levitation installation, the finished sample drops via a funnel into the collecting recipient 9 in the lower part of the device.

The whole process can be followed via the pyrometer 24.

Thereafter, the second preform can immediately be transferred from the magazine 7 into the process position 2 and be treated in the same way.

It has to be noted that the manufacture of a sample only takes a fraction of a second and that as many samples can be manufactured without interruption as the magazine 7 and the collecting recipient 9 can contain. By optimization of the lapse of time between heating up and cooling down, the evaporization of the sample prior to cooling can be completely avoided, if so desired.

The device is suited for research laboratories in which for example series of preforms of different composition are transformed into amorphous alloys for series tests. Also the temperature and time parameters can be varied from one sphere to the other by appropriately programming the process control. The invention is also adapted to the manufacture of platelet-shaped vitreous alloys on the industrial scale, insofar as the magazine 7 and the collecting recipient 9 are provided with sufficiently great capacities.

We claim:

1. A device for producing amorphous ceramic products or metal alloys by means of a high pressure autoclave in which firstly a preform of the sample is heated by means of laser beams up to melting temperature and then rapidly cooled down, below a process position (2), in which the sample is heated up and cooled down, an acousting levitation installation (12) is disposed, which is constituted by a piezoelectrically excited sound source and which levitates the sample in the process position (2) without contacting it, characterized in that the process position (2) is disposed in the intersection point of at least two laser beams (14, 15), which penetrate into the autoclave via windows (19) in view of heating up the sample, two stamps (20, 21) are disposed facing each other on either side of the process position (2) in the autoclave (1), which are susceptible to be electromagnetically pushed towards each other, in order to crush the sample therebetween and thus rapidly cool it down.

2. A device according to claim 1, characterized in that the process position (2) is situated in the intersection point of four laser beams, each of the laser beams running along the edge of an imagined four-sided pyramid.

3. A device according to claim 2, characterized in that respectively two facing laser beams are derived from a common laser generator (14 resp. 15).

4. A device according to claim 1, characterized in that a multiwavelengths pyrometer (24) is directed onto the process position (2) through a window (25) in the wall of the autoclave (1).

5. A device according to claim 1, characterized in that a programmable process control unit is provided, which controls the laser generators, the levitation installation (12) and the stamps (20, 21).

6. A device according to claim 1, characterized in that an acoustically permeable catch basket is disposed between the levitation installation (12) and the process position.

* * * * *